United States Patent
Yin

(10) Patent No.: US 12,335,050 B2
(45) Date of Patent: Jun. 17, 2025

(54) CHANNEL DROPPING AND PROCESSING TIMING REQUIREMENTS FOR UPLINK CHANNEL COLLISION WITH DIFFERENT PRIORITIES

(71) Applicant: SHARP KABUSHIKI KAISHA, Sakai (JP)

(72) Inventor: Zhanping Yin, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 400 days.

(21) Appl. No.: 17/798,494

(22) PCT Filed: Feb. 3, 2021

(86) PCT No.: PCT/JP2021/003901
§ 371 (c)(1),
(2) Date: Aug. 9, 2022

(87) PCT Pub. No.: WO2021/161867
PCT Pub. Date: Aug. 19, 2021

(65) Prior Publication Data
US 2023/0104984 A1  Apr. 6, 2023

Related U.S. Application Data

(60) Provisional application No. 62/975,380, filed on Feb. 12, 2020.

(51) Int. Cl.
*H04L 1/1829* (2023.01)
*H04W 72/20* (2023.01)
*H04W 72/56* (2023.01)

(52) U.S. Cl.
CPC ........... *H04L 1/1854* (2013.01); *H04W 72/20* (2023.01); *H04W 72/56* (2023.01)

(58) Field of Classification Search
CPC .... H04L 1/1854; H04L 1/1671; H04W 72/20; H04W 72/56; H04W 72/21; H04W 72/569
See application file for complete search history.

(56) References Cited

U.S. PATENT DOCUMENTS

2019/0363840 A1* 11/2019 Wang .................... H04L 1/1854
2020/0314686 A1* 10/2020 Godin ................. H04L 43/0852
(Continued)

OTHER PUBLICATIONS

"3rd Generation Partnership Project; Technical Specification Group Radio Access Network; NR; Physical layer procedures for control(Release 15)", 3GPP TS 38.213 V15.6.0 (Jun. 2019).
(Continued)

*Primary Examiner* — John D Blanton
(74) *Attorney, Agent, or Firm* — ScienBiziP, P.C.

(57) ABSTRACT

A user equipment (UE) is described. The UE includes a processor configured to determine a dropping timeline for low priority channel dropping when a low priority channel collides with a high priority physical uplink control channel (PUCCH) carrying a hybrid automatic repeat request-acknowledgement (HARQ-ACK). The processor is also configured to determine a processing delay for the high priority PUCCH when the low priority channel collides with the high PUCCH. The UE also includes transmitting circuitry configured to transmit the PUCCH carrying the HARQ-ACK based on the dropping timeline and the processing delay.

3 Claims, 9 Drawing Sheets

(56) References Cited

U.S. PATENT DOCUMENTS

| | | | | |
|---|---|---|---|---|
| 2020/0367241 A1* | 11/2020 | Hosseini | ............ | H04W 72/0453 |
| 2021/0135740 A1* | 5/2021 | Zhou | ...................... | H04W 80/02 |
| 2021/0243795 A1* | 8/2021 | Kuo | ...................... | H04L 1/1822 |
| 2022/0217755 A1* | 7/2022 | Fu | ............................ | H04W 8/24 |
| 2023/0022915 A1* | 1/2023 | Bhamri | ................ | H04B 7/0408 |
| 2023/0035066 A1* | 2/2023 | Bae | ................... | H04W 72/1268 |
| 2023/0104984 A1* | 4/2023 | Yin | ....................... | H04L 1/1671 |
| | | | | 370/329 |
| 2023/0370211 A1* | 11/2023 | Wang | .................... | H04L 1/1864 |
| 2024/0305416 A1* | 9/2024 | Gou | ...................... | H04L 1/1896 |

OTHER PUBLICATIONS

"3rd Generation Partnership Project; Technical Specification Group Radio Access Network; NR; Physical layer procedures for data(Release 15)", 3GPP TS 38.214 V15.6.0 (Jun. 2019).

VIVO, "UCI enhancements for URLLC", R1-1912031, 3GPP TSG RAN WG1 #99, Reno, USA, Nov. 18-22, 2019.

\* cited by examiner

Method 2: High priority channel processing delay is configured independently with $d_{1,2} >= d_{1,1}$

CHANNEL DROPPING AND PROCESSING TIMING REQUIREMENTS FOR UPLINK CHANNEL COLLISION WITH DIFFERENT PRIORITIES

TECHNICAL FIELD

The present disclosure relates generally to communication systems. More specifically, the present disclosure relates to channel dropping and processing timing requirements for uplink channel collision with different priorities.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE), comprising: a processor configured to: determine a dropping timeline for low priority channel dropping when a low priority channel collides with a high priority physical uplink control channel (PUCCH) carrying a hybrid automatic repeat request-acknowledgement (HARQ-ACK), and determine a processing delay for the high priority PUCCH when the low priority channel collides with the high PUCCH; and transmitting circuitry configured to transmit the PUCCH carrying the HARQ-ACK based on the dropping timeline and the processing delay.

In one example, a base station (gNB), comprising: a processor configured to: determine a dropping timeline for low priority channel dropping when a low priority channel collides with a high priority physical uplink control channel (PUCCH) carrying a hybrid automatic repeat request-acknowledgement (HARQ-ACK), and determine a processing delay for the high priority PUCCH when the low priority channel collides with the high PUCCH; and receiving circuitry configured to receive the PUCCH carrying the HARQ-ACK based on the dropping timeline and the processing delay.

In one example, a method by a user equipment (UE), comprising: determining a dropping timeline for low priority channel dropping when a low priority channel collides with a high priority physical uplink control channel (PUCCH) carrying a hybrid automatic repeat request-acknowledgement (HARQ-ACK), and determining a processing delay for the high priority PUCCH when the low priority channel collides with the high PUCCH; and transmitting the PUCCH carrying the HARQ-ACK based on the dropping timeline and the processing delay.

In one example, a method by a base station (gNB), comprising: determining a dropping timeline for low priority channel dropping when a low priority channel collides with a high priority physical uplink control channel (PUCCH) carrying a hybrid automatic repeat request-acknowledgement (HARQ-ACK), and determining a processing delay for the high priority PUCCH when the low priority channel collides with the high PUCCH; and receiving the PUCCH carrying the HARQ-ACK based on the dropping timeline and the processing delay.

DESCRIPTION OF EMBODIMENTS

Figure 1:
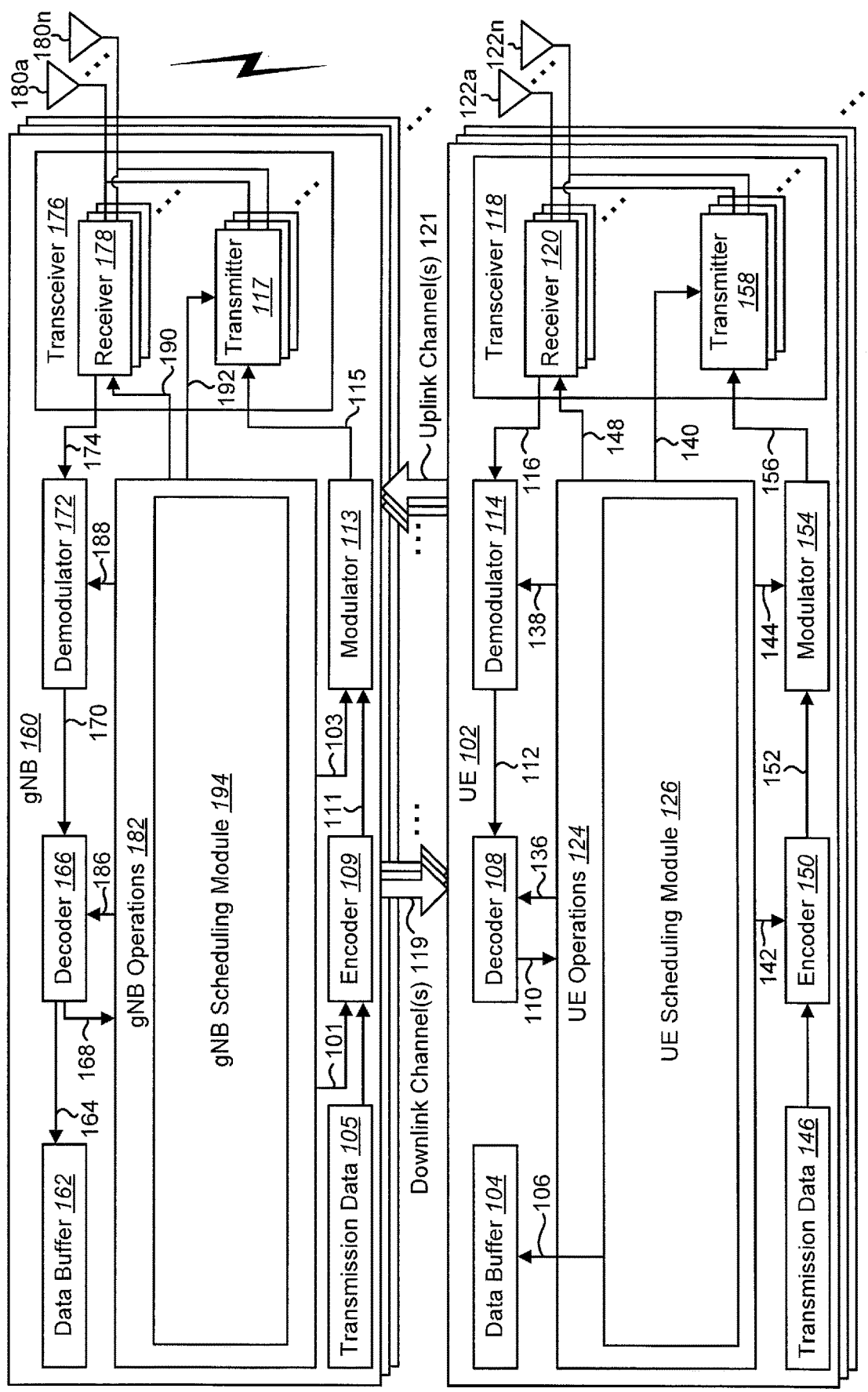
FIG. 1 is a block diagram illustrating one implementation of one or more gNBs 160 and one or more UEs 102 in which systems and methods for channel dropping and processing timing requirements for uplink channel collision with different priorities may be implemented.

A user equipment (UE) is described. The UE includes a processor configured to determine a dropping timeline for low priority channel dropping when a low priority channel collides with a high priority physical uplink control channel (PUCCH) carrying a hybrid automatic repeat request-acknowledgement (HARQ-ACK). The processor is also configured to determine a processing delay for the high priority PUCCH when the low priority channel collides with the high PUCCH. The UE also includes transmitting circuitry configured to transmit the PUCCH carrying the HARQ-ACK based on the dropping timeline and the processing delay.

In an example for a high priority physical downlink shared channel (PDSCH) scheduled by downlink control information (DCI), the low priority channel may be dropped after a number of PDSCH processing time symbols (N) and a number of dropping delay symbols ($d_{1,1}$) after the end of PDSCH transmission. In another example for a high priority PDSCH scheduled by DCI, the low priority channel may be dropped after a number of PDSCH processing time symbols ($N_1$) and a number of dropping delay symbols ($d_{1,1}$) after the end of the DCI scheduling the PDSCH transmission.

In an example, for a high priority PDSCH scheduled by a semi-persistent scheduling (SPS) release, the low priority channel may be dropped after a number of PDSCH processing time symbols ($N_1$) and a number of dropping delay symbols ($d_{1,1}$) after the end of SPS PDSCH transmission. In another example for a high priority PDSCH scheduled by an SPS release, the low priority channel may be dropped after a number of PDSCH processing time symbols after the end of SPS PDSCH transmission.

In an example, the processing delay for the high priority PUCCH may include a number of dropping delay symbols ($d_{1,1}$) and a number of extra delay symbols ($d_{1,2}$). In another example, the processing delay for the high priority PUCCH may include a number of extra delay symbols ($d_{1,2}$) that is independent from dropping delay symbols ($d_{1,1}$).

A base station (gNB) is also described. The gNB includes a processor configured to determine a dropping timeline for low priority channel dropping when a low priority channel collides with a high priority PUCCH carrying a HARQ-ACK. The processor is also configured to determine a processing delay for the high priority PUCCH when the low priority channel collides with the high PUCCH. The gNB also includes receiving circuitry configured to receive the PUCCH carrying the HARQ-ACK based on the dropping timeline and the processing delay.

A method by a UE is also described. The method includes determining a dropping timeline for low priority channel dropping when a low priority channel collides with a high priority PUCCH carrying a HARQ-ACK. The method also includes determining a processing delay for the high priority PUCCH when the low priority channel collides with the high PUCCH. The method further includes transmitting the PUCCH carrying the HARQ-ACK based on the dropping timeline and the processing delay.

A method by a gNB is also described. The method includes determining a dropping timeline for low priority channel dropping when a low priority channel collides with a high priority PUCCH carrying a HARQ-ACK. The method also includes determining a processing delay for the high priority PUCCH when the low priority channel collides with the high PUCCH. The method further includes receiving the PUCCH carrying the HARQ-ACK based on the dropping timeline and the processing delay.

The 3rd Generation Partnership Project, also referred to as "3GPP," is a collaboration agreement that aims to define globally applicable technical specifications and technical reports for third, fourth, and fifth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, 16, 17, etc.). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time/frequency/space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station or base station device.

In NR Release-16 (referred to herein as Rel-16), for intra-UE collision handling at the physical (PHY) layer, in the case that a high-priority UL transmission overlaps with a low-priority UL transmission, the high priority UL channel is transmitted, and the low-priority UL channel transmission is dropped fully or partially depending on timeline constraints. A dropping timeline for low priority channel collision with high priority PUCCH of URLLC HARQ-ACK is described herein. For example, in this disclosure, a detailed dropping timeline of the low priority channel when it collides with a high priority PUCCH carrying high priority HARQ-ACK is described. The timeline for channel dropping may be different based on whether the PDSCH is scheduled by a DCI or by a semi-persistent scheduling (SPS) release. Furthermore, the processing time of the high priority channel may be postponed due to channel dropping.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for channel dropping and processing timing requirements for uplink channel collision with different priorities may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

In some examples, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR) signals. The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. For example, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104, and a UE operations module 124. For example, one or more reception and/or transmission paths may be implemented in the UE 102. For convenience, only a single transceiver 118, decoder 108, demodulator 114, encoder 150, and modulator 154 are illustrated in the UE 102, though multiple parallel elements (e.g., transceivers 118, decoders 108, demodulators 114, encoders 150, and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126. In some examples, the UE scheduling module 126 may be utilized to perform channel dropping and processing timing requirements for uplink channel collision with different priorities as described herein.

UCI types reported in a PUCCH may include HARQ-ACK information, SR, LRR, and CSI. UCI bits may include HARQ-ACK information bits, if any, SR information bits, if any, LRR information bit, if any, and CSI bits, if any. The HARQ-ACK information bits correspond to a HARQ-ACK codebook.

In NR Rel-16, two levels of priorities can be indicated for different services. For example, a lower priority or priority index 0 may be indicated for eMBB services. A higher priority or priority index 1, may be indicated for URLLC service.

To resolve collision between UL transmissions, a UE may perform the following. In a first step, the UE may resolve collision between UL transmissions with the same priority. In a second step, the UE may resolve collision between UL transmissions with different priorities.

For UL channel transmission in Rel-16, UCI multiplexing of different priorities are not supported. In a case of a collision between different priorities, the high priority channel is transmitted, and the low priority channel is dropped.

When a high-priority UL transmission overlaps with a low-priority UL transmission in a slot, the UE is expected to cancel the low-priority UL transmission starting from $T_{proc,2}+d_1$ after the end of PDCCH scheduling the high-priority transmission. In this case, $T_{proc,2}$ is the UE processing time capability for the carrier. Value $d_1$ is the time duration corresponding to 0, 1, 2 symbols reported by UE capability. It should be noted that $d_{2,1}=0$ is for cancellation. The minimum processing time of the high priority channel may be extended by $d_2$ symbols, where $d_2$ is the time duration corresponding to 0, 1, 2 symbols reported by UE capability. The overlapping condition may be per repetition of the uplink transmission.

The timeline above mainly refers to PUSCH transmission scheduling by a DCI. Basically, in the case of intra-UE UL channel collision with different priorities, the low priority channel should be cancelled as soon as the high priority channel transmission is known. On the other hand, the minimum processing time of the high priority channel may be extended to allow the process of the cancellation of the low priority channel. However, the detailed timeline for the collision case between a high priority PUCCH carrying high priority HARQ-ACK and a low priority channel is not defined yet.

Examples of a timeline for low priority channel dropping when colliding with a PUCCH carrying a high priority HARQ-ACK codebook are described herein. For a high priority PUCCH with a high priority HARQ-ACK codebook, a high priority HARQ-ACK is corresponding to a high priority PDSCH transmission. The PDSCH may be a scheduled transmission or a SPS release, and the processing timeline can be slightly different between them.

After a first step of resolved collision between UL transmissions with same priority, if there is a collision between channels with different priorities, the low priority channel may be dropped fully or partial depending on the timeline relationships. If the high priority channel starts at the same symbol as the low priority channel or the high priority channel starts earlier than the low priority channel, the low priority channel is fully dropped without transmission, and only the high priority channel is transmitted.

If the starting symbol of a low priority channel is earlier than a high priority channel, different methods may be considered depending on the timing restrictions, especially if the high priority channel transmission is known before the low priority channel transmission. The dropping timeline and processing timeline for this case are described herein.

Examples of a low priority channel dropping timeline are described herein. Let $T_{proc,1}$ correspond to the UE processing time of a high priority PDSCH transmission for the carrier. The transmission of a PUCCH carrying the HARQ-ACK for the corresponding PDSCH can be known $T_{proc,1}$ plus $d_{1,1}$ symbols after the end of last high priority PDSCH transmission.

In one method, if the starting symbol of the low priority channel is not earlier than $T_{proc,1}$ plus $d_{1,1}$ symbols after the end of last high priority PDSCH transmission, the low priority channel can be fully dropped, as shown in FIG. 2(a). Value $d_{1,1}$ may be the time duration corresponding to 0, 1, 2 symbols reported by UE capability. Otherwise, the low priority PUCCH for eMBB HARQ-ACK transmission is already started when the UE realizes the high priority PUCCH for high priority HARQ-ACK should be scheduled. The low priority channel can be dropped from $T_{proc,1}$ plus $d_{1,1}$ symbols after the end of last high priority PDSCH transmission, as shown in FIG. 2(b).

Thus, for a PDSCH scheduled by a DCI, the UE may drop the low priority UL channel from a first symbol $S_0$ of the low priority UL low priority UL channel (e.g., PUCCH or PUSCH), where $S_0$ is not before a symbol with CP starting after $T_{proc,1}^{drop}$ after a last symbol of any corresponding PDSCH, $T_{proc,1}^{drop}$ is given by the maximum of $\{T_{proc,1}^{drop,1}, \ldots, T_{proc,1}^{drop,i}, \ldots\}$ where for the i-th PDSCH with corresponding HARQ-ACK transmission on a PUCCH for high priority HARQ-ACK, $T_{proc,1}^{drop,i}=(N_1+d_{1,1}+1)\cdot(2048+144)\cdot\kappa\cdot 2^{-\mu}\cdot T_C$, $d_{1,1}$ is selected for the i-th PDSCH following TS 38.214, $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs.

Alternatively with further enhancement, in another method, for a PDSCH scheduled by a DCI, the UE may drop the low priority UL channel from a first symbol $S_0$ of the low priority UL low priority UL channel (PUCCH or PUSCH), where $S_0$ is not before a symbol with CP starting after $T_{proc,1}^{drop}$ after the last symbol of any DCI scheduling the corresponding PDSCH, $T_{proc,1}^{drop}$ is given by maximum of $\{T_{proc,1}^{drop,1}, \ldots, T_{proc,1}^{drop,i}, \ldots\}$ where for the i-th PDSCH with corresponding HARQ-ACK transmission on a PUCCH for high priority HARQ-ACK, $T_{proc,1}^{drop,i}=(N_1+d_{1,1}+1)\cdot(2048+144)\cdot\kappa\cdot 2^{-\mu}\cdot T_C$, $d_{1,1}$ is selected for the i-th PDSCH following TS 38.214, $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs. Compare with the previous method, the UE can drop the low priority UL channel after the scheduling DCI is detected with the corresponding PUCCH starting point.

For a high priority PDSCH by a SPS release, the processing time is defined separately from a PDSCH scheduled by a DCI. In one method, the dropping timeline is determined based on the processing time of a PDSCH by a SPS release and plus $d_{1,1}$ symbols after the end of PDSCH transmission of a SPS release, where value $d_{1,1}$ may be the time duration corresponding to 0, 1, 2 symbols reported by UE capability. Thus, for a high priority PDSCH by a SPS release, the UE may drop the low priority UL channel from a first symbol $S_0$ of the low priority UL low priority UL channel (PUCCH or PUSCH), where $S_0$ is not before a symbol with CP starting after $T_{proc,release}^{drop}$ after a last symbol of any corresponding SPS PDSCH release. $T_{proc,release}^{drop}$ is given by maximum of $\{T_{proc,release}^{drop,1}, \ldots, T_{proc,release}^{drop,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{drop,i}=(N+1+d_{1,1})\cdot(2048+144)\cdot\kappa\cdot2^{-\mu}\cdot T_C$, N is described in Clause 10.2 of TS38.213 and is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

In another method, the dropping timeline is determined based on the processing time of a PDSCH by a SPS release only. Thus, for a high priority PDSCH by a SPS release, the UE may drop the low priority UL channel from a first symbol $S_0$ of the low priority UL low priority UL channel (PUCCH or PUSCH), where $S_0$ is not before a symbol with CP starting after $T_{proc,release}^{drop}$ release after a last symbol of any corresponding SPS PDSCH release. $T_{proc,release}^{drop}$ is given by maximum of $\{T_{proc,release}^{drop,1}, \ldots, T_{proc,release}^{drop,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{drop,i}=(N+1)\cdot(2048+144)\cdot\kappa\cdot2^{-\mu}$, $T_C$, N is described in Clause 10.2 of TS38.213 and is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

Processing time delay requirements for high priority PUCCH with URLLC HARQ-ACK are also described herein. Due to the evaluation of channel collision and channel dropping of low priority channels, the processing time for the high priority PUCCH with URLLC HARQ-ACK may be extended with some extra delay. For example, the minimum processing time of the high priority channel may be extended by $d_{1,2}$ symbols, where value $d_{1,2}$ is the time duration corresponding to 0, 1, 2 or more symbols reported by UE capability.

The HARQ-ACK timing of a PDSCH transmission may be determined by the PDSCH-to-HARQ timing indication with a k value. If the PUCCH resource is configured at subslot level, a subslot structure or duration is configured. For a PDSCH transmission ended in subslot n, the HARQ-ACK should be report in a PUCCH resource in subslot n+k. If the PUCCH resource is configured at slot level, for a PDSCH transmission ended in slot n, the HARQ-ACK should be reported in a PUCCH resource in slot n+k. In all cases, the HARQ-ACK timing should satisfy the processing time requirements even with processing delay considerations.

Thus, in the case of channel collision with different priorities, and if dropping of low priority channel is performed, the UE expects that the first symbol of the high priority PUCCH for high priority HARQ-ACK, among a group overlapping PUCCHs and PUSCHs in the slot, satisfies the following timeline conditions.

In one method, the extra delay $d_{1,2}$ may be applied jointly with the dropping delay $d_{1,1}$, where value $d_{1,2}$ and $d_{1,2}$ are the time durations corresponding to 0, 1, 2 reported by UE capability.

Figure 3:
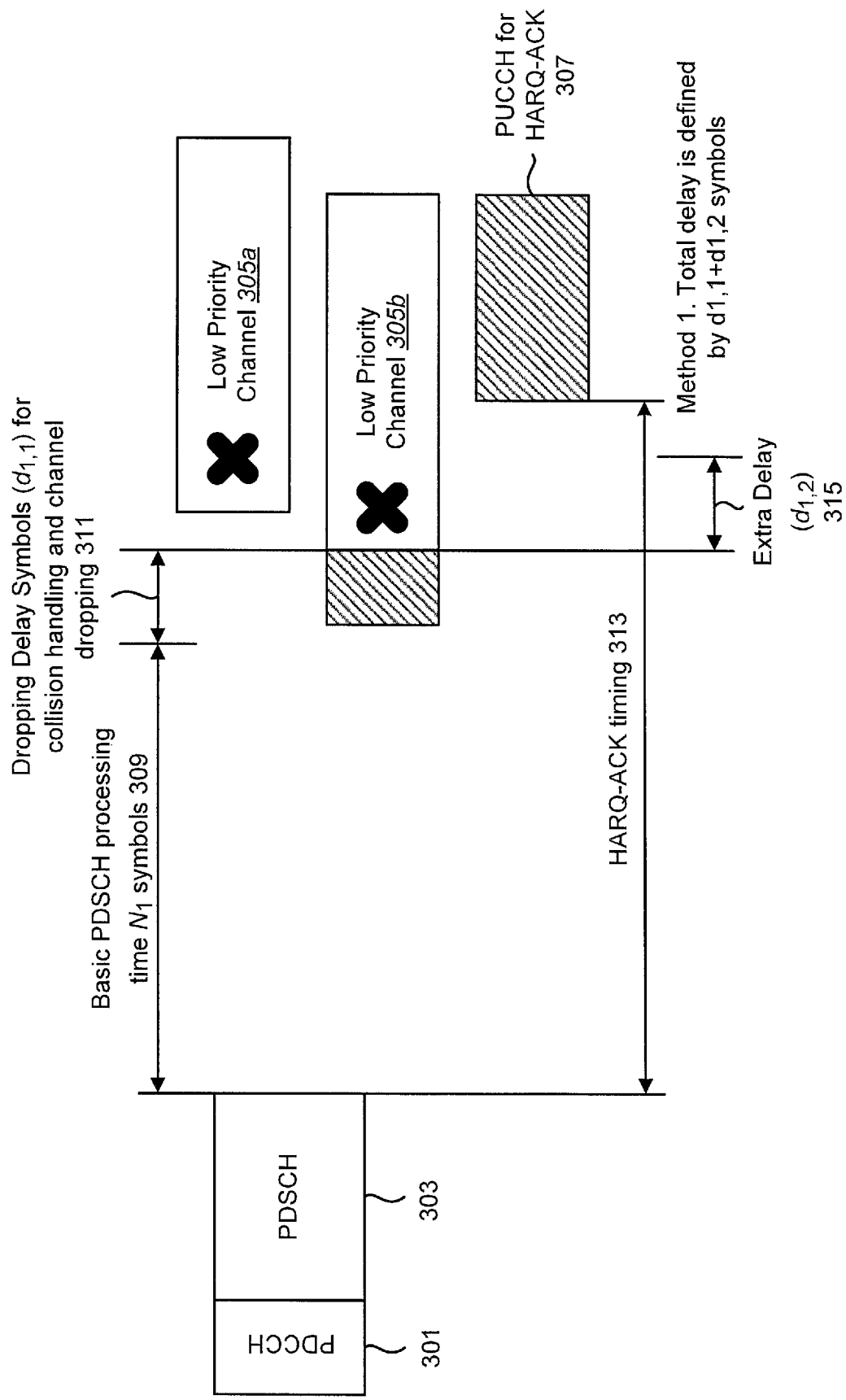
FIG. 3 illustrates an example of a high priority channel processing delay due to channel collision and channel dropping.

For a PDSCH scheduled by a DCI, $S_0$ is not before a symbol with CP starting after $T_{proc,1}^{delay}$ after a last symbol of any corresponding PDSCH, $T_{proc,1}^{delay}$ is given by maximum of $\{T_{proc,1}^{delay,1}, \ldots, T_{proc,1}^{delay,i}, \ldots\}$, where for the i-th PDSCH with corresponding HARQ-ACK transmission on a PUCCH which is in the group of overlapping PUCCHs and PUSCHs, $T_{proc,1}^{delay,i}=(N_1+d_{1,1}+d_{1,2}+1)\cdot(2048+144)\cdot\kappa^{-\mu}\cdot T_C$, $d_{1,1}$ and $d_{1,2}$ are selected for the i-th PDSCH, $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs. In this method, the processing timeline requirement for a PDSCH is extended by a total of $d_{1,1}+d_{1,2}$ symbols, as shown in FIG. 3.

Figure 4:
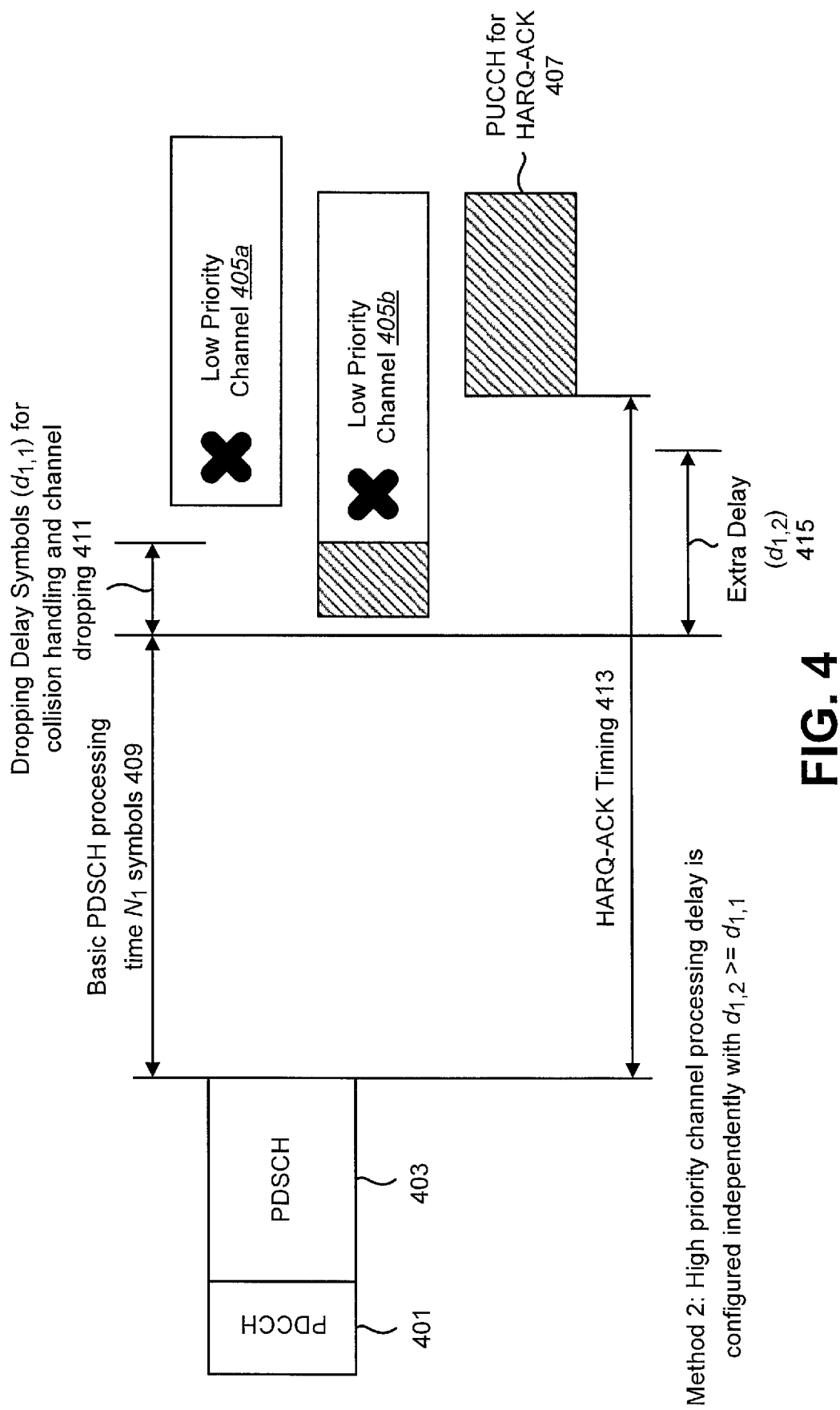
FIG. 4 illustrates another example of a high priority channel processing delay due to channel collision and channel dropping.

In another method, the extra delay $d_{1,2}$ may be applied independently from the dropping delay $d_{1,1}$. In this case, the value of $d_{1,2}$ should be the same as or greater than the value $d_{1,1}$, where value $d_{1,2}$ is the time duration corresponding to 0, 1, 2 or more symbols reported by UE capability. Thus, in this method, $d_{1,2}$ may be determined for the total delay required to perform collision resolution and channel dropping and be configured with a larger number than $d_{1,1}$, For a PDSCH scheduled by a DCI, $S_0$ is not before a symbol with CP starting after $T_{proc,1}^{delay}$ after a last symbol of any corresponding PDSCH, $T_{proc,1}^{delay}$ is given by maximum of $\{T_{proc,1}^{delay,1}, \ldots, T_{proc,1}^{delay,i}, \ldots\}$ where for the i-th PDSCH with corresponding HARQ-ACK transmission on a PUCCH which is in the group of overlapping PUCCHs and PUSCHs, $T_{proc,1}^{delay,i}=(N_1+d_{1,2}+1)\cdot(2048+144)\cdot\kappa\cdot2^{-\mu}$, $T_C$, $d_{1,2}$ is selected for the i-th PDSCH, $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs. In this method, the processing timeline requirement for a PDSCH is extended by $d_{1,2}$ symbols, as shown in FIG. 4.

For a high priority PDSCH by a SPS release, in one method, if the dropping timeline is determined based on the processing time of a PDSCH by a SPS release and plus $d_{1,1}$ symbols after the end of PDSCH transmission of a SPS release, and the extra delay $d_{1,2}$ may be applied jointly with the dropping delay $d_{1,1}$, the $S_0$ is not before a symbol with CP starting after $T_{proc,release}^{delay}$ after a last symbol of any corresponding SPS PDSCH release. $T_{proc,release}^{delay}$ is given by maximum of $\{T_{proc,release}^{delay,1}, \ldots, T_{proc,release}^{delay,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{delay,i}=(N+1+d_{1,1}+d_{1,2})\cdot(2048+144)\cdot\kappa\cdot2^{-\mu}$, $T_C$, N is described in Clause 10.2 of TS38.213 and is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs. In this method, the processing timeline requirement for a PDSCH is extended by a total of $d_{1,1}+d_{1,2}$ symbols.

For a high priority PDSCH by a SPS release, if the dropping timeline is determined based on the processing time of a PDSCH by a SPS release only, or if the dropping timeline is determined based on the processing time of a PDSCH by a SPS release and plus $d_{1,1}$ symbols after the end of PDSCH transmission of a SPS release and if the extra delay $d_{1,2}$ may be applied independently from the dropping delay $d_{1,1}$, $S_0$ is not before a symbol with CP starting after $T_{proc,release}^{delay}$ after a last symbol of any corresponding SPS PDSCH release. $T_{proc,release}^{mux}$ is given by maximum of $\{T_{proc,release}^{delay,1}, \ldots, T_{proc,release}^{delay,i}, \ldots\}$ where for the i-th PDCCH providing the SPS PDSCH release with corresponding HARQ-ACK transmission on a PUCCH which is in the group of overlapping PUCCHs and PUSCHs, $T_{proc,release}^{delay,i}=(N+1+d_{1,2})\cdot(2048+144)\cdot\kappa\cdot 2^{-\mu}$, $T_C$, N is described in Clause 10.2 of TS38.213 and is selected based on the UE PDSCH processing capability of the i-th SPS PDSCH release and SCS configuration $\mu$, where $\mu$ corresponds to the smallest SCS configuration among the SCS configurations used for the PDCCH providing the i-th SPS PDSCH release, the PUCCH with corresponding HARQ-ACK transmission for i-th SPS PDSCH release, and all PUSCHs in the group of overlapping PUCCHs and PUSCHs.

In another approach, for simplicity, a single timeline can be defined for both channel dropping and high priority channel processing. Thus, a single delay parameter (e.g., $d_{1,1}$) can be selected to satisfy both low priority channel dropping and high priority channel processing timeline.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154.

For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162, and a gNB operations module 182. For example, one or more reception and/or transmission paths may be implemented in a gNB 160. For convenience, only a single transceiver 176, decoder 166, demodulator 172, encoder 109, and modulator 113 are illustrated in the gNB 160, though multiple parallel elements (e.g., transceivers 176, decoders 166, demodulators 172, encoders 109, and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for PUCCH repetition as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding.

For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
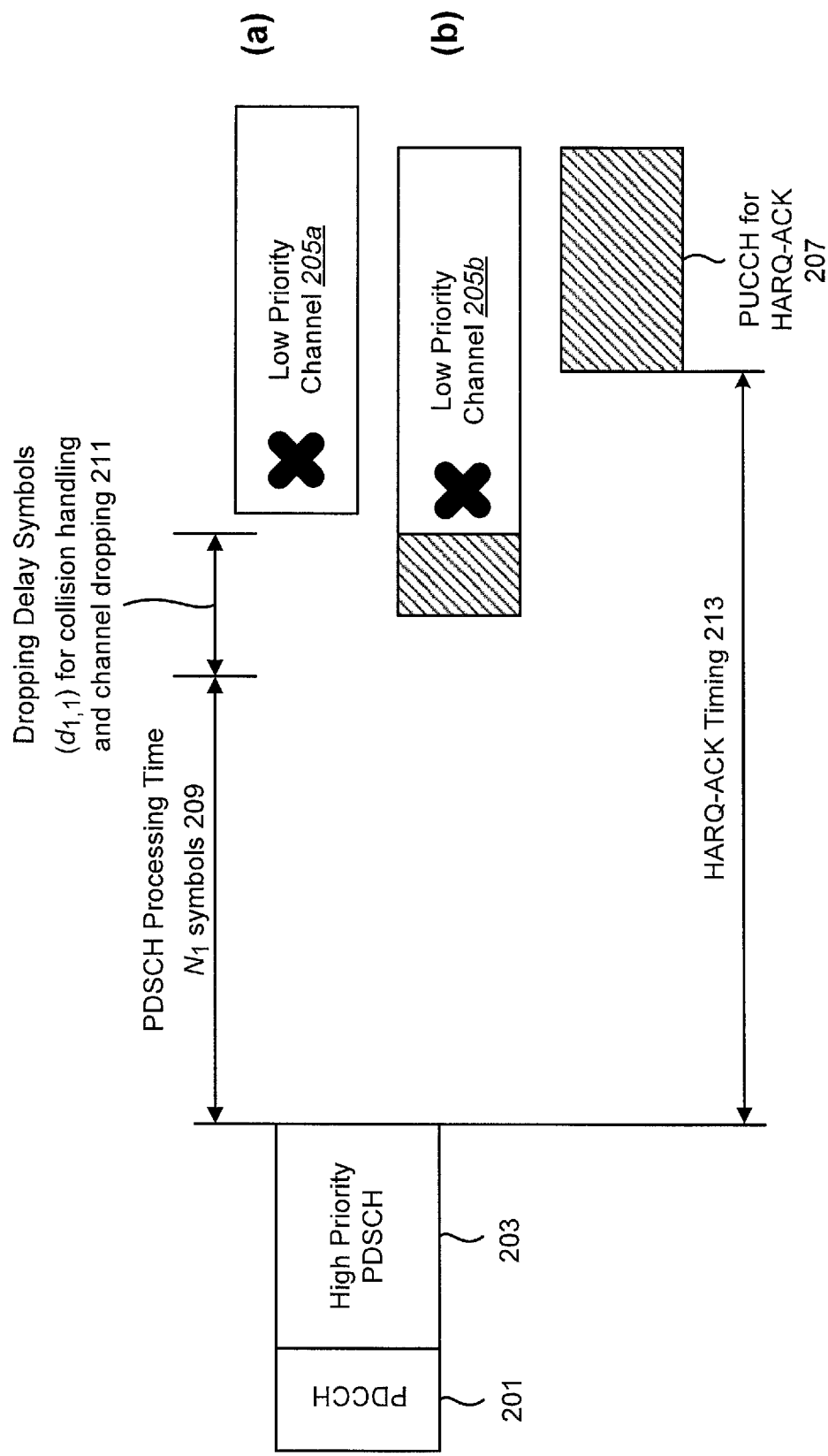
FIG. 2 illustrates examples of low priority channel dropping timelines.

FIG. 2 illustrates examples of low priority channel dropping timelines. In these examples, a high priority PDSCH 203 may follow a PDCCH 201. The PDSCH processing time 209 (referred to as $T_{proc,1}$) may be N1 symbols. Extra symbols 211 (referred to as $d_{1,1}$) may be for delay for collision handling and channel dropping. The HARQ-ACK timing 213 for the PUCCH 207 for the HARQ-ACK corresponding to the high priority PDSCH 203 is also shown.

In example (a), if the starting symbol of the low priority channel 205a is not earlier than $T_{proc,1}$ plus $d_{1,1}$ symbols after the end of last transmission of the high priority PDSCH 203, the low priority channel 205a can be fully dropped. Value $d_{1,1}$ (i.e., the extra symbols 211) may be the time duration corresponding to 0, 1, 2 symbols reported by UE capability.

In example (b), the low priority PUCCH for eMBB HARQ-ACK transmission is already started when the UE realizes the high priority PUCCH 207 for high priority HARQ-ACK should be scheduled. The low priority channel 205b can be dropped from $T_{proc,1}$ plus $d_{1,1}$ symbols after the end of last transmission of the high priority PDSCH 203.

FIG. 3 illustrates an example of a high priority channel processing delay due to channel collision and channel dropping. In this example, a high priority PDSCH 303 may follow a PDCCH 301. The basic PDSCH processing time 309 (referred to as $T_{proc,1}$) may be N1 symbols. Extra symbols 311 (referred to as a dropping delay $d_{1,1}$) may be for delay for collision handling and channel dropping. The HARQ-ACK timing 313 for the PUCCH 307 for the HARQ-ACK corresponding to the high priority PDSCH 303 is also shown.

A low priority channel 305a that starts $T_{proc,1}$ plus $d_{1,1}$ symbols after the end of last transmission of the high priority PDSCH 303 can be fully dropped, as described in FIG. 2. The low priority channel 305b can be dropped from $T_{proc,1}$ plus $d_{1,1}$ symbols after the end of last transmission of the high priority PDSCH 303, as described in FIG. 2.

In one method, the extra delay 315 (referred to as $d_{1,2}$) may be applied jointly with the dropping delay ($d_{1,1}$) 311, where value $d_{1,1}$ and $d_{1,2}$ are the time durations corresponding to 0, 1, 2 reported by UE capability. Therefore, the total delay for the PUCCH 307 for the HARQ-ACK for the high priority PDSCH 303 is defined by $d_{1,1}+d_{1,2}$. In other words, in this method, the processing timeline requirement for a PDSCH 303 is extended by a total of $d_{1,1}+d_{1,2}$ symbols.

FIG. 4 illustrates another example of a high priority channel processing delay due to channel collision and channel dropping. In this example, a high priority PDSCH 403 may follow a PDCCH 401. The basic PDSCH processing time 409 (referred to as $T_{proc,1}$) may be N1 symbols. Extra symbols 411 (referred to as a dropping delay $d_{1,1}$) may be for delay for collision handling and channel dropping. The HARQ-ACK timing 413 for the PUCCH 407 for the HARQ-ACK corresponding to the high priority PDSCH 403 is also shown.

A low priority channel 405a that starts $T_{proc,1}$ plus $d_{1,1}$ symbols after the end of last transmission of the high priority PDSCH 403 can be fully dropped, as described in FIG. 2. The low priority channel 405b can be dropped from $T_{proc,1}$ plus $d_{1,1}$ symbols after the end of last transmission of the high priority PDSCH 403, as described in FIG. 2.

In this method, the extra delay 415 (referred to as $d_{1,2}$) may be applied independent of the dropping delay ($d_{1,1}$) 411. In this case $d_{1,2}+d_{1,1}$. Therefore, the processing timeline requirement for a PDSCH 403 is extended by $d_{1,2}$ symbols.

Figure 5:
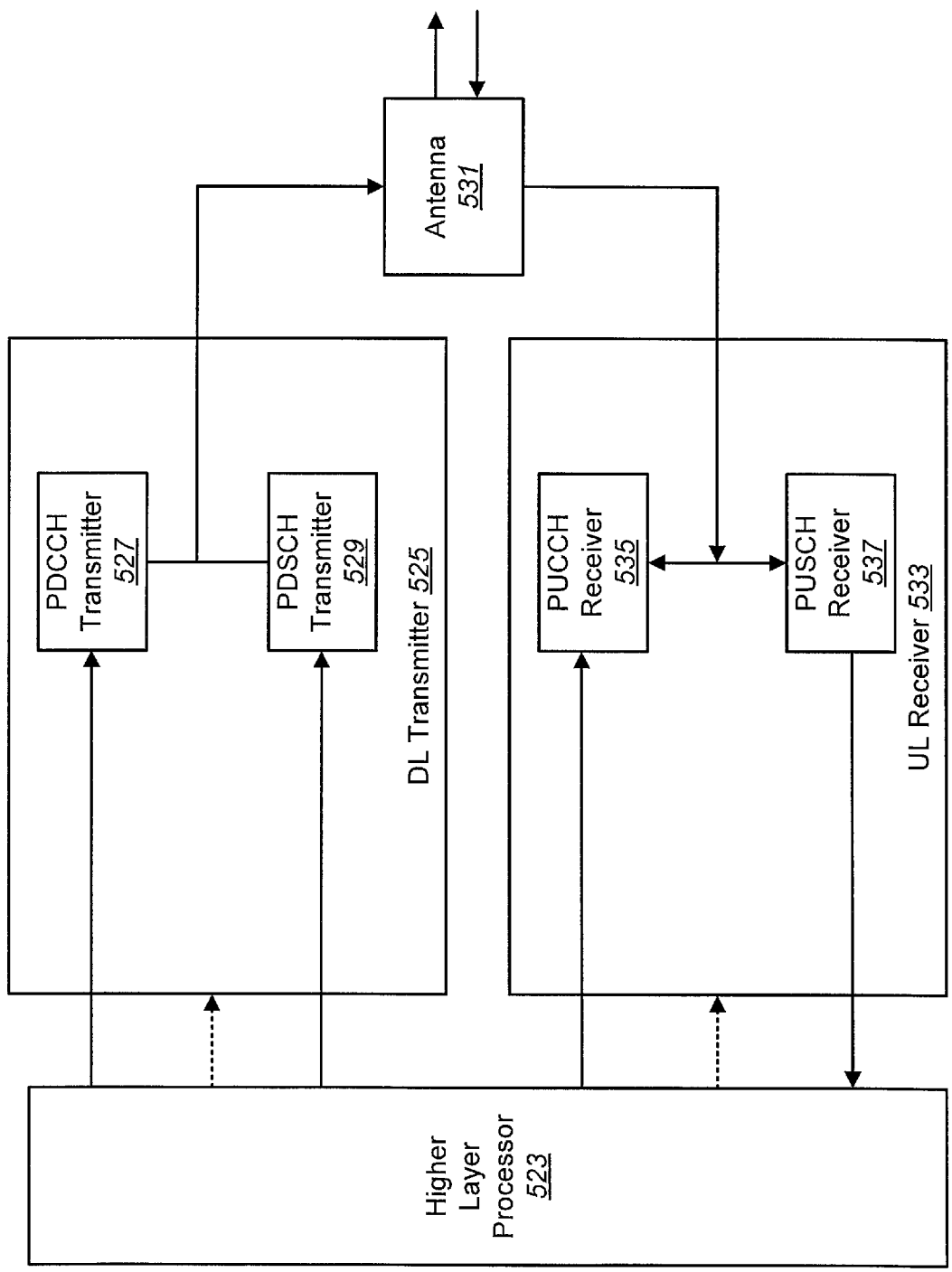
FIG. 5 is a block diagram illustrating one implementation of a gNB.

FIG. 5 is a block diagram illustrating one implementation of a gNB 560. The gNB 560 may be implemented in accordance with the gNB 160 described in connection with FIG. 1 in some examples, and/or may perform one or more of the functions described herein. The gNB 560 may include a higher layer processor 523, a DL transmitter 525, a UL receiver 533, and one or more antenna 531. The DL transmitter 525 may include a PDCCH transmitter 527 and a PDSCH transmitter 529. The UL receiver 533 may include a PUCCH receiver 535 and a PUSCH receiver 537.

The higher layer processor 523 may manage physical layer's behaviors (the DL transmitter's and the UL receiver's behaviors) and provide higher layer parameters to the physical layer. The higher layer processor 523 may obtain transport blocks from the physical layer. The higher layer processor 523 may send/acquire higher layer messages such as an RRC message and MAC message to/from a UE's higher layer. The higher layer processor 523 may provide the PDSCH transmitter transport blocks and provide the PDCCH transmitter transmission parameters related to the transport blocks.

The DL transmitter 525 may multiplex downlink physical channels and downlink physical signals (including reservation signal) and transmit them via transmission antennas 531. The UL receiver 533 may receive multiplexed uplink physical channels and uplink physical signals via receiving antennas 531 and de-multiplex them. The PUCCH receiver 535 may provide the higher layer processor 523 UCI. The PUSCH receiver 537 may provide the higher layer processor 523 received transport blocks.

Figure 6:
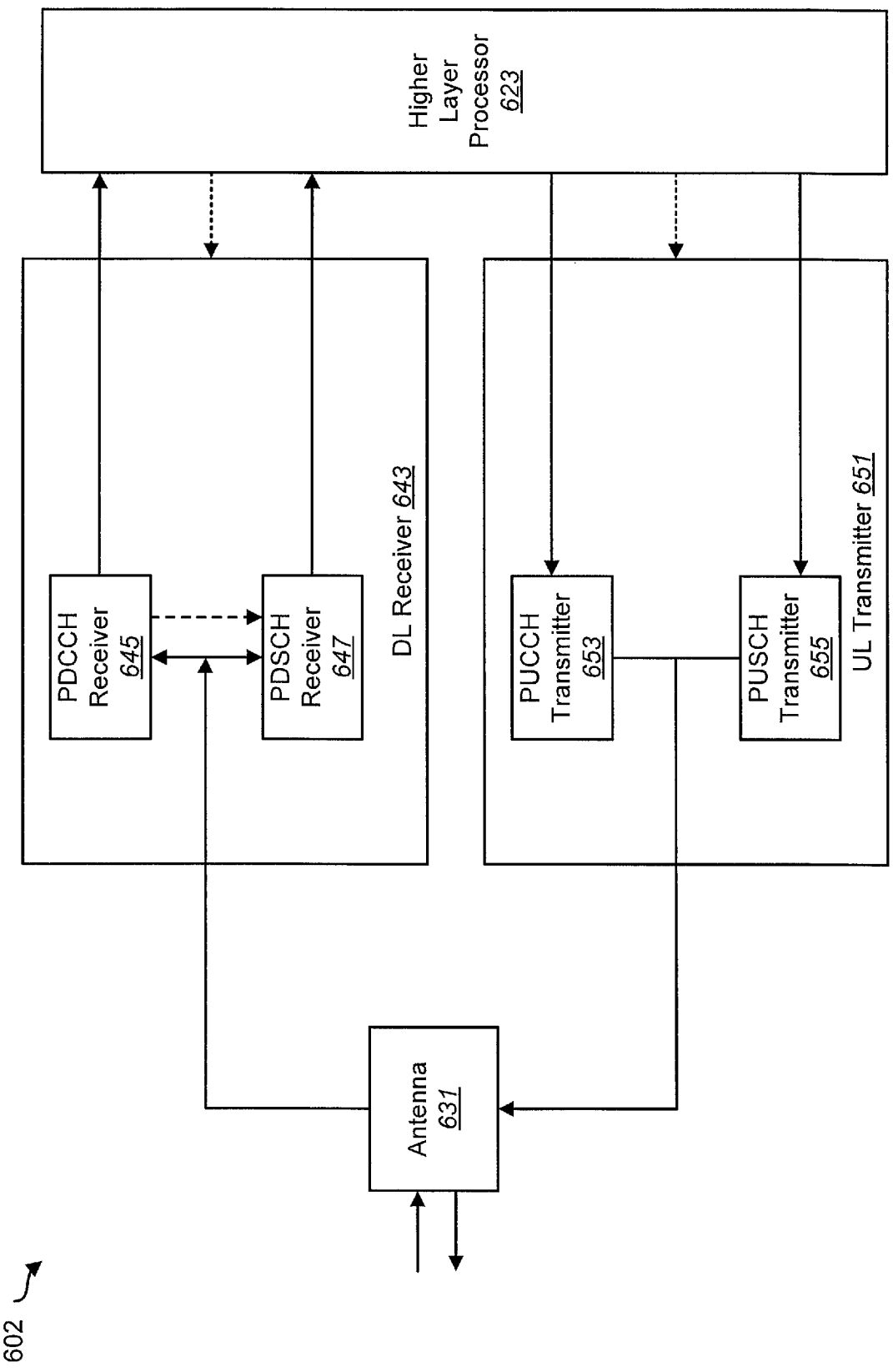
FIG. 6 is a block diagram illustrating one implementation of a UE.

FIG. 6 is a block diagram illustrating one implementation of a UE 602. The UE 602 may be implemented in accordance with the UE 102 described in connection with FIG. 1 in some examples, and/or may perform one or more of the functions described herein. The UE 602 may include a higher layer processor 623, a UL transmitter 651, a DL receiver 643, and one or more antenna 631. The UL transmitter 651 may include a PUCCH transmitter 653 and a PUSCH transmitter 655. The DL receiver 643 may include a PDCCH receiver 645 and a PDSCH receiver 647.

The higher layer processor 623 may manage physical layer's behaviors (the UL transmitter's and the DL receiver's behaviors) and provide higher layer parameters to the physical layer. The higher layer processor 623 may obtain transport blocks from the physical layer. The higher layer processor 623 may send/acquire higher layer messages such as an RRC message and MAC message to/from a UE's higher layer. The higher layer processor 623 may provide the PUSCH transmitter transport blocks and provide the PUCCH transmitter 653 UCI.

The DL receiver 643 may receive multiplexed downlink physical channels and downlink physical signals via receiving antennas 631 and de-multiplex them. The PDCCH receiver 645 may provide the higher layer processor 623 DCI. The PDSCH receiver 647 may provide the higher layer processor 623 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 7:
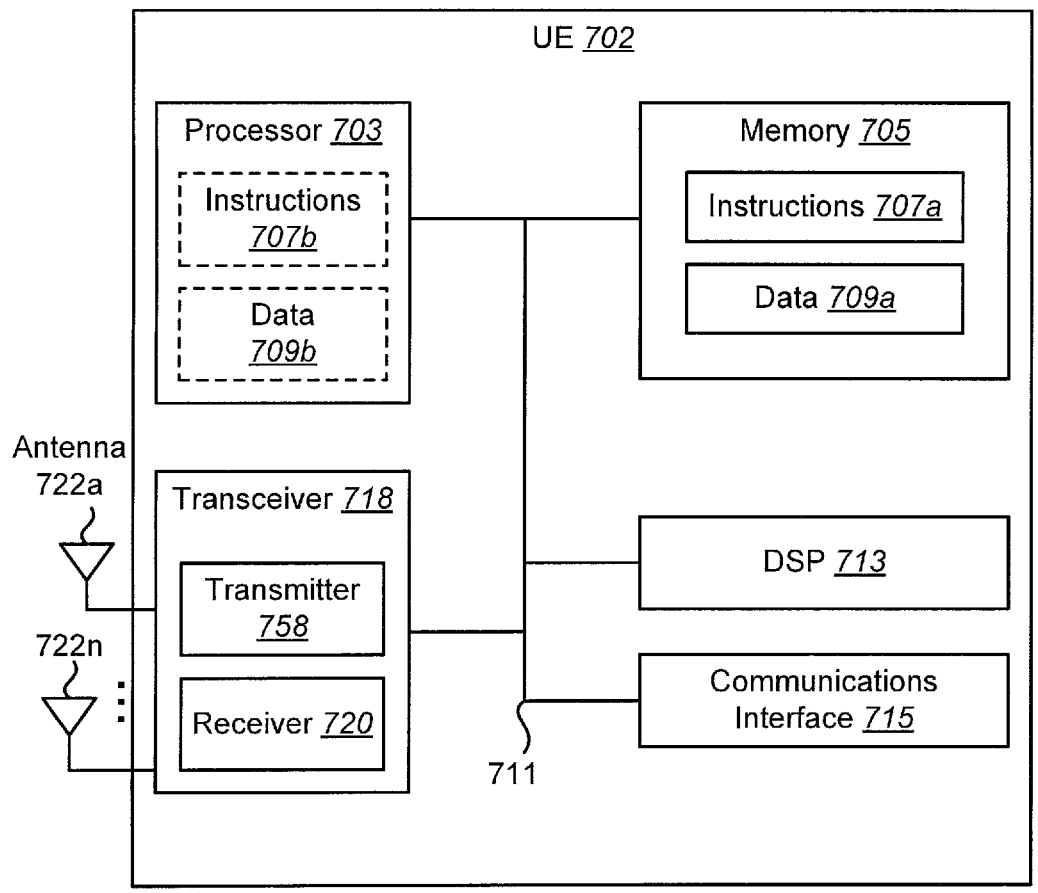
FIG. 7 illustrates various components that may be utilized in a UE.

FIG. 7 illustrates various components that may be utilized in a UE 702. The UE 702 described in connection with FIG. 7 may be implemented in accordance with the UE 102 described in connection with FIG. 1. The UE 702 includes a processor 703 that controls operation of the UE 702. The processor 703 may also be referred to as a central processing unit (CPU). Memory 705, which may include read-only memory (ROM), random access memory (RAM), a combination of the two or any type of device that may store information, provides instructions 707a and data 709a to the processor 703. A portion of the memory 705 may also include non-volatile random-access memory (NVRAM). Instructions 707b and data 709b may also reside in the processor 703. Instructions 707b and/or data 709b loaded into the processor 703 may also include instructions 707a and/or data 709a from memory 705 that were loaded for execution or processing by the processor 703. The instructions 707b may be executed by the processor 703 to implement the methods described above.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722a-n are attached to the housing and electrically coupled to the transceiver 718.

The various components of the UE 702 are coupled together by a bus system 711, which may include a power bus, a control signal bus, and a status signal bus, in addition to a data bus. However, for the sake of clarity, the various buses are illustrated in FIG. 7 as the bus system 711. The UE 702 may also include a digital signal processor (DSP) 713 for use in processing signals. The UE 702 may also include a communications interface 715 that provides user access to the functions of the UE 702. The UE 702 illustrated in FIG. 7 is a functional block diagram rather than a listing of specific components.

Figure 8:
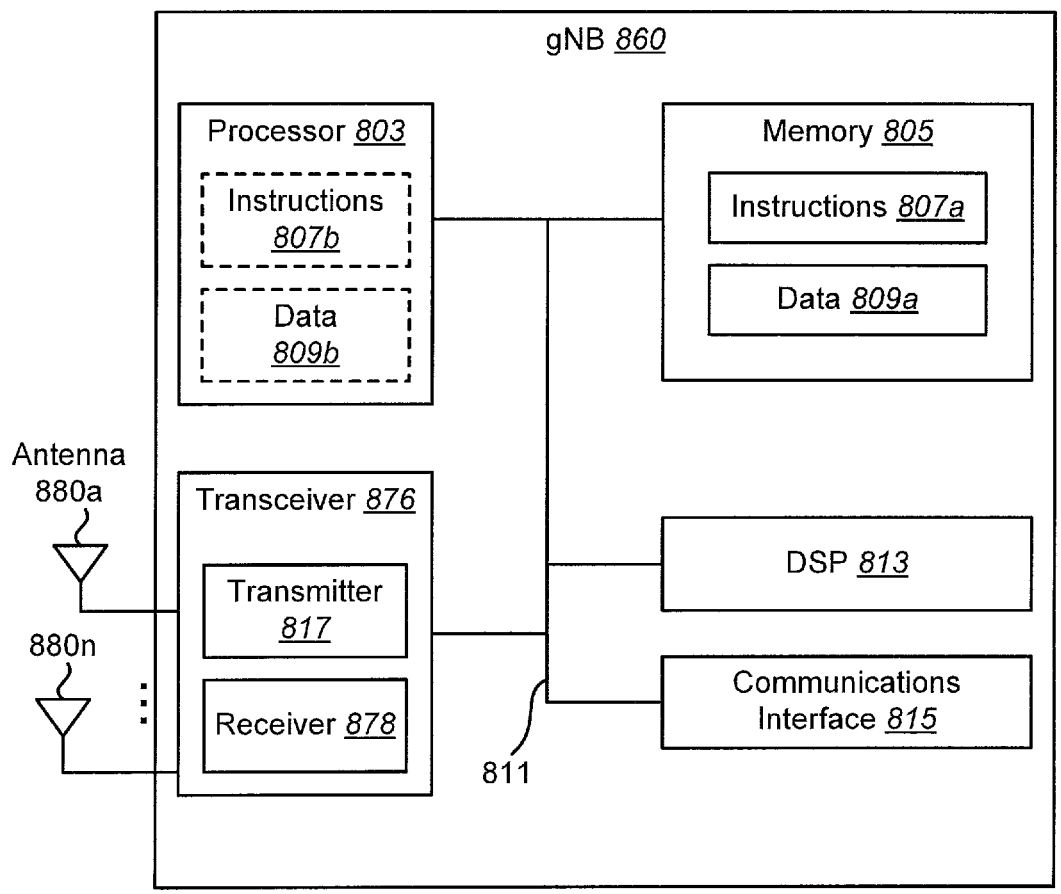
FIG. 8 illustrates various components that may be utilized in a gNB.

FIG. 8 illustrates various components that may be utilized in a gNB 860. The gNB 860 described in connection with FIG. 8 may be implemented in accordance with the gNB 160 described in connection with FIG. 1. The gNB 860 includes a processor 803 that controls operation of the gNB 860. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random-access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement the methods described above.

The gNB 860 may also include a housing that contains one or more transmitters 817 and one or more receivers 878 to allow transmission and reception of data. The transmitter(s) 817 and receiver(s) 878 may be combined into one or more transceivers 876. One or more antennas 880a-n are attached to the housing and electrically coupled to the transceiver 876.

The various components of the gNB 860 are coupled together by a bus system 811, which may include a power bus, a control signal bus, and a status signal bus, in addition to a data bus. However, for the sake of clarity, the various buses are illustrated in FIG. 8 as the bus system 811. The gNB 860 may also include a digital signal processor (DSP) 813 for use in processing signals. The gNB 860 may also include a communications interface 815 that provides user access to the functions of the gNB 860. The gNB 860 illustrated in FIG. 8 is a functional block diagram rather than a listing of specific components.

Figure 9:
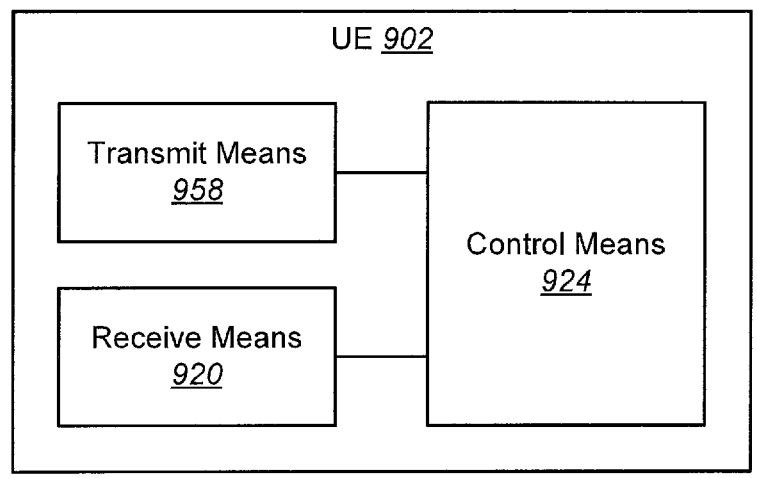
FIG. 9 is a block diagram illustrating one implementation of a UE in which systems and methods for PUCCH repetition may be implemented.

FIG. 9 is a block diagram illustrating one implementation of a UE 902 in which the systems and methods described herein may be implemented. The UE 902 includes transmit means 958, receive means 920 and control means 924. The transmit means 958, receive means 920 and control means 924 may be configured to perform one or more of the functions described in connection with FIG. 1 above. FIG. 7 above illustrates one example of a concrete apparatus structure of FIG. 9. Other various structures may be implemented to realize one or more of the functions of FIG. 1. For example, a DSP may be realized by software.

Figure 10:
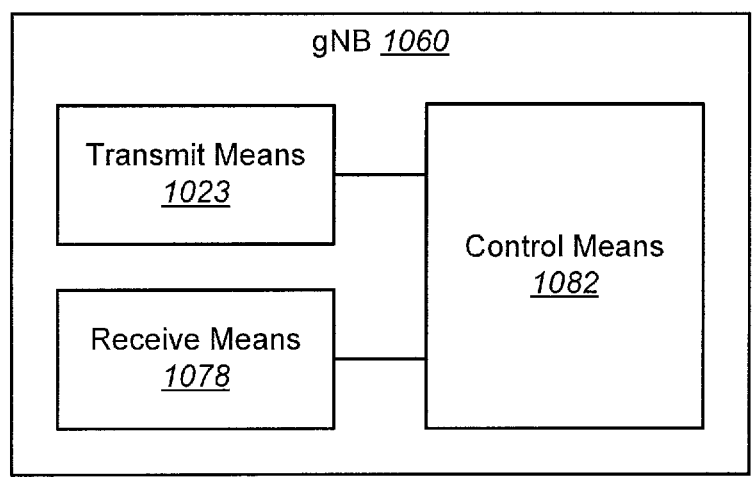
FIG. 10 is a block diagram illustrating one implementation of a gNB in which systems and methods for PUCCH repetition may be implemented.

FIG. 10 is a block diagram illustrating one implementation of a gNB 1060 in which the systems and methods described herein may be implemented. The gNB 1060 includes transmit means 1023, receive means 1078 and control means 1082. The transmit means 1023, receive means 1078 and control means 1082 may be configured to perform one or more of the functions described in connection with FIG. 1 above. FIG. 8 above illustrates one example of a concrete apparatus structure of FIG. 10. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B, and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

<Cross Reference>

This Nonprovisional application claims priority under 35 U.S.C. § 119 on provisional Application No. 62/975,380 on Feb. 12, 2020, the entire contents of which are hereby incorporated by reference.

What is claimed is:

1. A user equipment (UE), comprising:
a processor configured to:
determine a dropping timeline for low priority channel dropping when a low priority channel collides with a high priority physical uplink control channel (PUCCH) carrying a hybrid automatic repeat request-acknowledgement (HARQ-ACK), and determine a processing delay for the high priority PUCCH when the low priority channel collides with the high priority PUCCH; and transmitting circuitry configured to transmit the high priority PUCCH carrying the HARQ-ACK based on the dropping timeline and the processing delay, wherein, for a high priority physical downlink shared channel (PDSCH) scheduled by downlink control information (DCI), the low priority channel is dropped after a number of PDSCH processing time symbols ($N_1$) and a number of dropping delay symbols ($d_{1,1}$) after an end of a PDSCH transmission.

2. A base station (gNB), comprising:

a processor configured to:
- determine a dropping timeline for low priority channel dropping when a low priority channel collides with a high priority physical uplink control channel (PUCCH) carrying a hybrid automatic repeat request-acknowledgement (HARQ-ACK), and
- determine a processing delay for the high priority PUCCH when the low priority channel collides with the high priority PUCCH; and receiving circuitry configured to receive the high priority PUCCH carrying the HARQ-ACK based on the dropping timeline and the processing delay, wherein, for a high priority physical downlink shared channel (PDSCH) scheduled by downlink control information (DCI), the low priority channel is dropped after a number of PDSCH processing time symbols ($N_1$) and a number of dropping delay symbols ($d_{1,1}$) after an end of a PDSCH transmission.

3. A method performed by a user equipment (UE), the method comprising:

determining a dropping timeline for low priority channel dropping when a low priority channel collides with a high priority physical uplink control channel (PUCCH) carrying a hybrid automatic repeat request-acknowledgement (HARQ-ACK);

determining a processing delay for the high priority PUCCH when the low priority channel collides with the high priority PUCCH; and transmitting the high priority PUCCH carrying the HARQ-ACK based on the dropping timeline and the processing delay, wherein, for a high priority physical downlink shared channel (PDSCH) scheduled by downlink control information (DCI), the low priority channel is dropped after a number of PDSCH processing time symbols ($N_1$) and a number of dropping delay symbols ($d_{1,1}$) after an end of a PDSCH transmission.

* * * * *